United States Patent [19]

Mizuno et al.

[11] 4,253,347

[45] Mar. 3, 1981

[54] AUTOMATIC SPEED RATIO CONTROL SYSTEM FOR STEPLESS TRANSMISSION OF AUTOMOTIVE VEHICLES

[75] Inventors: Kiyofumi Mizuno, Nagoya; Hiroaki Maeda, Toyota; Shigeo Takahashi, Kariya; Masanori Sato; Satomi Suzuki, both of Nagoya, all of Japan

[73] Assignee: Aisin Seiki Kabushiki Kaisha, Kariya, Japan

[21] Appl. No.: 930,117

[22] Filed: Aug. 1, 1978

[30] Foreign Application Priority Data

Aug. 10, 1977 [JP] Japan .................................. 52/95896

[51] Int. Cl.³ ....................... B60K 41/16; B60K 41/06
[52] U.S. Cl. ........................................ 74/862; 74/866; 74/867
[58] Field of Search .................. 74/861, 862, 867, 866

[56] References Cited

U.S. PATENT DOCUMENTS

| | | | |
|---|---|---|---|
| 3,237,398 | 3/1966 | Croswhite | 60/433 |
| 3,641,845 | 2/1972 | Uozumi | 74/867 |
| 3,657,934 | 4/1972 | Ito | 74/861 |
| 3,657,934 | 4/1972 | Ito et al. | 74/866 |
| 3,803,843 | 4/1974 | Nyman et al. | 60/445 |
| 3,898,893 | 8/1975 | Hushimoto et al. | 74/866 |
| 3,927,528 | 12/1975 | Kolk et al. | 74/861 |
| 3,949,627 | 4/1976 | Murakami | 74/867 |
| 3,958,466 | 5/1976 | Espenschied | 74/867 |
| 4,008,567 | 2/1977 | Hirsch | 74/866 |
| 4,039,061 | 8/1977 | Pruvot et al. | 74/866 X |
| 4,082,013 | 4/1978 | Dornfeld et al. | 74/866 |
| 4,091,690 | 5/1978 | Miyao | 74/867 |
| 4,131,035 | 12/1978 | Mizuno et al. | 74/866 |
| 4,157,124 | 6/1979 | Poore | 74/866 |

*Primary Examiner*—Leslie Braun
*Attorney, Agent, or Firm*—Sughrue, Rothwell, Mion, Zinn & Macpeak

[57] ABSTRACT

An automatic speed ratio control system of the integration servo mechanism type for a stepless transmission of an automotive vehicle. Speed ratio is controlled by a hydraulic pump motor of variable displacement type, which in turn is controlled by an actuator having a piston and a cylinder to which hydraulic oil is supplied. The system comprises a target value generator which produces a target value for an engine speed corresponding to a throttle opening or an output torque of an engine, or which produces a target value for an engine output torque corresponding to a throttle opening or an engine speed; a detector for producing a signal indicative of an engine speed or an output torque of an engine; a control signal generator for comparing the signal from the detector against the signal from the target value generator to produce a control signal in accordance with a deviation therebetween; and a controller responsive to the control signal to drive the actuator to change a speed ratio of the stepless transmission. The system is characterized by further comprising means for controlling a gain of the alteration rate of the speed ratio in response to a rotational speed of an output shaft of the stepless transmission to increase the alteration rate when the rotational speed of the output shaft is low and decrease the alteration rate when the rotational speed of the output shaft is high.

5 Claims, 13 Drawing Figures

AUTOMATIC SPEED RATIO CONTROL SYSTEM FOR STEPLESS TRANSMISSION OF AUTOMOTIVE VEHICLES

BACKGROUND OF THE INVENTION

The invention relates to an automatic speed ratio control system which controls the speed ratio of a stepless transmission of an automotive vehicle so that a given engine condition is achieved.

The output torque $T_E$ of an engine is related to the torque which is dissipated by the running of the vehicle as the following equation, assuming no torque loss:

$$T_E = (J \cdot \dot{n}_2 + A \cdot n_2^2 + B) \times e \quad (1)$$

where "e" represents a speed ratio, "$n_2$" represents the rotational speed of an output shaft, $\dot{n}_2$ represents $dn_2/dt$, "J" represents the output inertia, "A" represents windage loss and "B" represents grade resistance. Since the speed ratio "e" presents the ratio of the rotational speed "$n_2$" of the output shaft to that "$n_1$" of the input shaft, we have $$n_2 = e \cdot n_1 \quad (2)$$

Figures 12, 13:
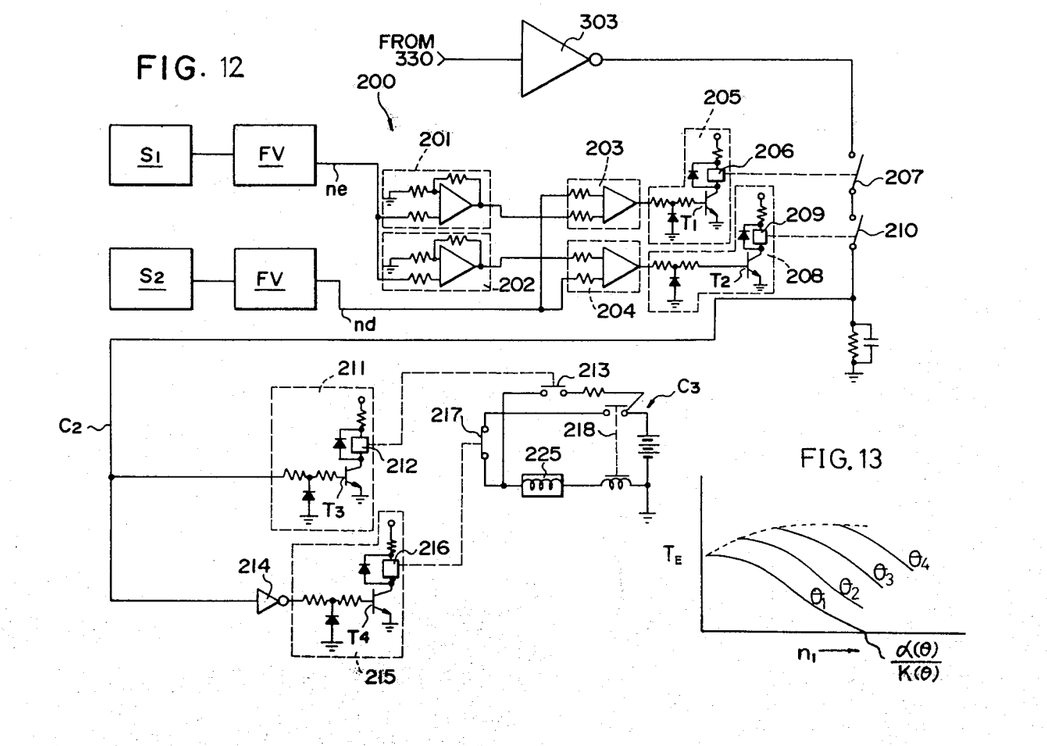
FIG. 12 is a schematic diagram of a clutch control circuit shown in FIG. 4.
FIG. 13 graphically shows the relationship between the rotational speed "$n_1$" and the output torque $T_E$ of the engine.

On the other side, the output torque $T_E$ of an internal combustion vehicle engine especially a gasoline engine has a characteristic as shown in FIG. 13 and is represented by the following equation (3):

$$T_E = -K(\theta) \cdot n_1 + \alpha(\theta) \quad (3)$$

Accordingly, we have the following equation (3)'':

$$\dot{e} = \frac{1}{J \cdot n_2} (K(\theta) \cdot n_1 - \alpha(\theta) + J \cdot e^2 \cdot \dot{n}_1 + An_2^2 \cdot e + B \cdot e) \quad (3)'$$

$$= \frac{K(\theta)}{J \cdot n_2} \left( n_1 - \frac{\alpha(\theta)}{K(\theta)} + \frac{J \cdot e^2}{K(\theta)} \cdot \dot{n}_1 + \frac{A \cdot e}{K(\theta)} \cdot n_2^2 + \frac{B}{K(\theta)} \cdot e \right) \quad (3)''$$

Prior to the invention, the speed ratio e was controlled on the basis of the following equation (4):

$$\dot{e} = K_1(n_1 - n_o) \quad (4)$$

wherein "$n_o$" represents a target speed of the engine and "$K_1$" represents a gain constant.

Comparing the equations (4) and (3)'', we can understand that $$\left( \frac{\alpha(\theta) - J \cdot e^2 \cdot \dot{n}_1 + A \cdot e \cdot n^2 + B \cdot e}{K(\theta)} \right)$$

of the equation (3)'' is represented by "$n_o$" of the equation (4), and $K(\theta)/J \cdot n_2$ of the equation (3)'' is represented by the gain constant "$K_1$" of the equation (4). The gain constant "$K_1$" is so determined as to fit with the normal running condition of the automotive vehicle. A prior system for controlling the speed ratio "e" on the basis of the equation (4) was disclosed in U.S. Pat. No. 3,803,843,. However, the system may cause an abrupt acceleration of the engine beyond the target speed at the starting $n_2 \approx 0$ of the automotive vehicle when the vehicle has a wide range of "$n_2$" and thus the variation range of the speed ratio "e" is wide. Because the alteration rate "$\dot{e}$" is not enough to increase the speed ratio "e" to transmit the output torque $T_E$ to the output shaft of the stepless transmission sufficiently. The insufficient speed ratio "e" at the starting may provide a driver with an unpleasant feeling and cause a fall of an acceleration ability of the automotive vehicle.

In another systems such as disclosed in U.S. Pat. No. 3,237,398, the alteration rate "$\dot{e}$" of the speed ratio "e" is controlled in response to the throttle opening "$\theta$" on the basis of the following equation (5):

$$\dot{e} = a \cdot \theta \quad (5)$$

However, the increase of the output torque $T_E$ of the engine may delay from the alteration of the throttle opening "$\theta$". Thus the alteration rate "$\dot{e}$" may lead the increase of the output torque $T_E$.

SUMMARY OF THE INVENTION

According to the invention, automatic speed ratio control system is provided, in order to improve the abrupt acceleration of the engine and the acceleration ability of the automotive vehicle at the starting, with a means for controlling the gain constant ($K_1$) of the alteration rate "$\dot{e}$" in response to the rotational speed of the output shaft of the stepless transmission to increase the alteration rate when the rotational speed of the output shaft is low and decrease the alteration rate when the rotational speed of the output shaft is high.

In a preferred control system, the means for controlling the gain constant is an orifice valve which is controlled by an output oil pressure of a governor valve which generates the output oil pressure depending on the rotational speed of the output shaft of the transmission. An output oil pressure of the orifice valve is applied to a speed ratio adjusting valve so as to adjust an output oil pressure of the speed ratio adjusting valve in response to the rotational speed of the output shaft. The output oil pressure of the speed ratio adjusting valve is applied to an speed ratio control actuator through a selector valve which controls a direction of the speed ratio adjustment.

In another preferred control system, the means for controlling the gain constant is a circuit means in an electric circuit which controls the speed ratio control actuator in response to electric signals from a potentiometer connected with the throttle valve of the engine and speed sensors connected to the input and output shafts of the transmission.

DESCRIPTION OF PREFERRED EMBODIMENTS

Figure 1:
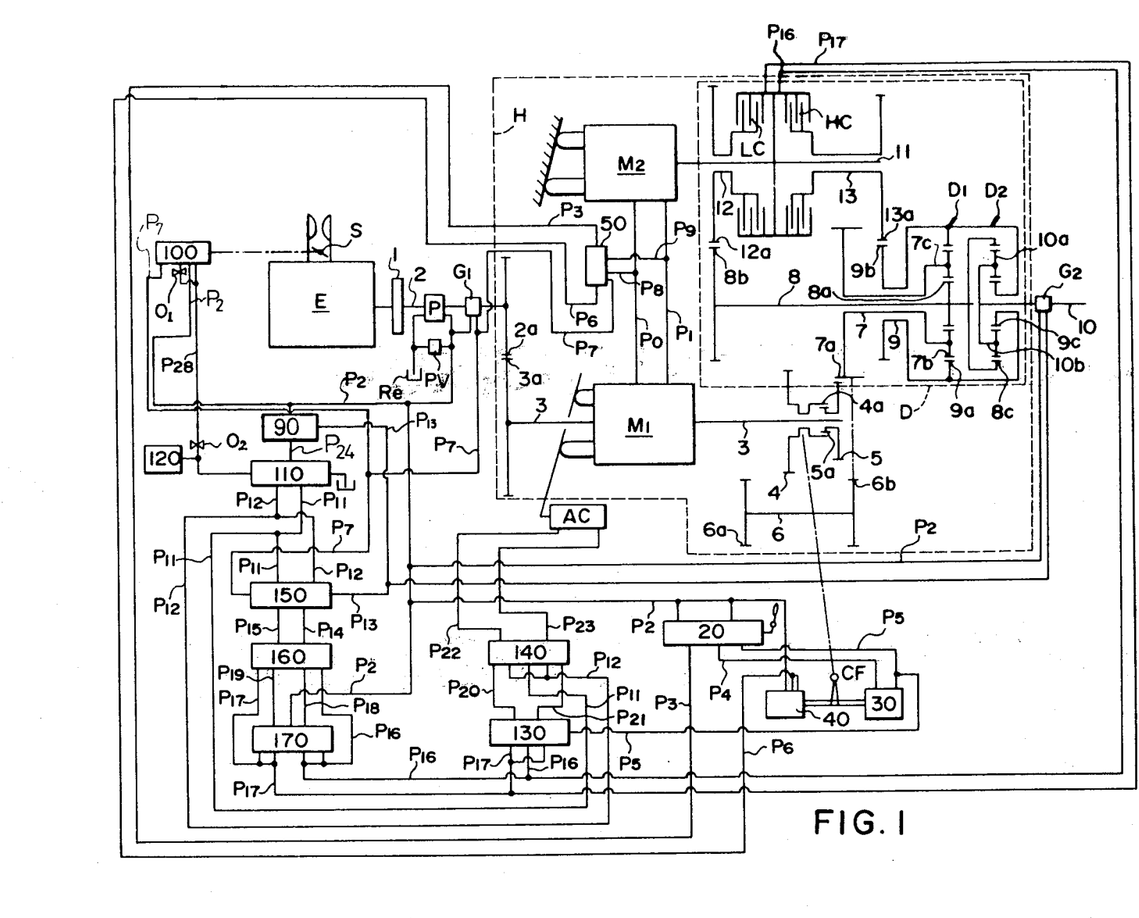
FIG. 1 is a schematic diagram illustrating the general arrangement of one embodiment of the invention.

Referring to FIG. 1, an engine E is connected through a flywheel 1 to an input shaft 2 of a hydro-mechanical transmission H. Connected with the input shaft 2 is a hydraulic pump P which cooperates with a relief valve PV to supply a given line pressure to an oil path $P_2$. Also connected with the input shaft 2 is a governor valve $G_1$ which adjusts the line pressure to a value which depends on the rotational speed of the engine E for supply to an oil path $P_7$. A gear 2a is fixedly mounted on the right-hand end of the input shaft 2, and meshes with a gear 3a fixedly mounted on the rotary shaft 3 of a first hydraulic pump motor $M_1$ of variable displacement type. A gear 4 is splined to the shaft 3 so as to be slidabe axially and carries on its right-hand end a dog gear 4a, which can be driven in the lateral direction by a forward reverse shifting fork CF. In its right-hand position, the dog gear 4a can mesh with a dog gear 5a on a gear 5 which is rotatably mounted on the shaft 3. In its right-hand end position, it meshes with a left-hand gear 6a on a reverse shaft 6. The gear 5 and a right-hand gear 6b on the reverse shaft 6 are maintained in meshing engagement with a gear 7a on an intermediate shaft 7 which forms part of a differential gearing D. The differential gearing D includes a first epicyclic gearing $D_1$ and a second epicyclic gearing $D_2$. The first epicyclic gearing $D_1$ includes a sun gear 8a which is fixedly mounted on a first reaction shaft 8, on the left-hand end of which is fixedly mounted a gear 8b which meshes with an output gear 12a of a low range clutch LC. A ring gear 8c of the second epicyclic gearing $D_2$ is fixedly mounted on the right-hand end of the first reaction shaft 8. The first epicyclic gearing $D_1$ also includes a ring gear 9a which is fixedly mounted on a second reaction shaft 9 which is in turn rotatably mounted on the intermediate shaft 7. A gear 9b is fixedly mounted on the left-hand end of the second reaction shaft 9 and meshes with an output gear 13a of a high range clutch HC. A sun gear 9c of the second epicyclic gearing $D_2$ is fixedly mounted on the right-hand end of the second reaction shaft 9. The first epicyclic gearing $D_1$ also includes a planet gear 7b rotatably mounted on a carrier 7c which is located on the right-hand end of the intermediate shaft 7 which is in turn rotatably mounted on the first reaction shaft 8. The second epicyclic gearing $D_2$ includes a planet gear 10a which is rotatably mounted on a carrier 10b located on the left-hand end of an output shaft 10. A second hydraulic pump motor $M_2$ of a fixed displacement type is connected with the first pump motor $M_1$ through oil paths $P_o$ and $P_1$ and includes a rotary shaft 11 on which the low range and the high range clutch LC, HC are mounted. The low range clutch LC has an output shaft 12 which is rotatably mounted on the rotary shaft 11 and which rotates integrally therewith in response to the line pressure of an oil path $P_{17}$. Similarly, the high range clutch HC has an output shaft 13 which is rotatably mounted on the rotary shaft 11 and which rotates integrally therewith in response to the line pressure of an oil path $P_{16}$.

Figure 9:
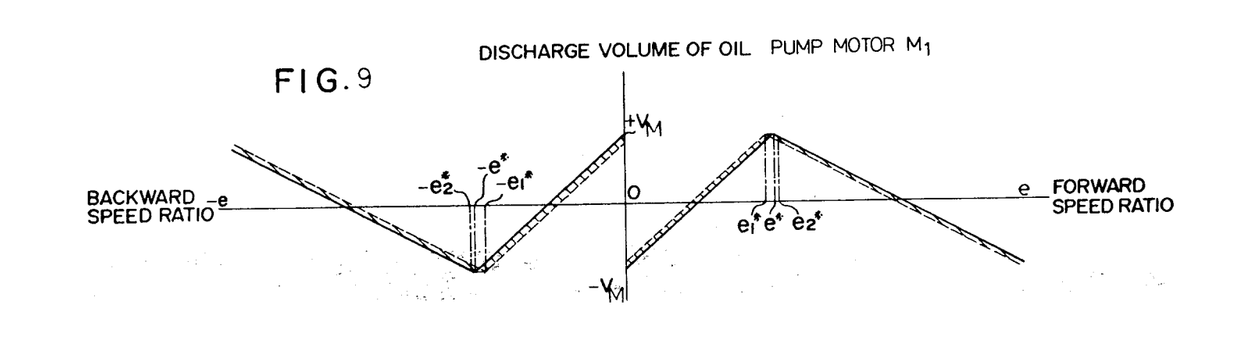
FIG. 9 graphically shows the relationship between the speed ratio of hydro-mechanical transmission and the discharge volume of a first hydraulic pump motor.

With the hydro-mechanical transmission H, when the dog gears 4a, 5a are brought into meshing engagement with each other and either low range or high range clutch LC or HC is actuated, the output shaft 10 can be rotated in the same direction as the input shaft 2. Conversely, when the gears 4, 6a are brought into meshing engagement with each other, the actuation of either clutch LC or HC rotates the output shaft 10 in the opposite direction from the input shaft 2. The meshing engagement between the dog gears 4a, 5a combined with the actuation of the low range clutch LC represents a status of transmission in the low speed ratio region in the forward direction while the meshing engagement between the dog gears 4a, 5a combined with the actuation of the high range clutch HC represents a status of transmission in the high speed ratio region in the forward direction. Conversely, the meshing engagement between the gears 4 and 6a achieves a status of a transmission in the low speed ratio region when the low range clutch LC is actuated, and in the high speed ratio region when the high range clutch HC is actuated, both in the reverse direction. The relationship between the discharge volume V of the first hydraulic pump motor $M_1$ and the forward speed ratio "e" or reverse speed ratio "−e" is illustrated in FIG. 9 by a shaded band, considering the oil leakage within the motors $M_1$, $M_2$. The solid line in FIG. 9 represents the relationship which results when the oil leakage is null. By contrast, the broken lines correspond to a maximum oil leakage.

A control system for the hydro-mechanical transmission H will now be described. A manual shift valve 20 shown in the lower right-hand portion of FIG. 1 controls a communication between oil paths $P_3$, $P_4$, $P_5$ on one hand and oil path $P_2$ and reservoir Re on the other, and has three positions, namely a neutral, a forward and a reverse position. In its forward position, valve 20 disconnects path $P_3$ from reservoir Re and connects it with path $P_2$, and also disconnects both paths $P_4$, $P_5$ from either path $P_2$ or reservoir Re. In the forward position, the valve disconnects path $P_3$ from path $P_2$ and connect the former with reservoir Re, and connects paths $P_4$ and $P_5$ with path $P_2$ and reservoir Re, respectively. In the reverse position, the valve disconnects path $P_3$ from path $P_2$ and connects the former with reservoir Re, and also connects paths $P_4$ and $P_5$ with reservoir Re and path $P_2$, respectively.

An actuator 30 is connected with paths $P_4$ and $P_5$ for shifting the forward/reverse shifting fork CF in the lateral direction. When the valve 20 shifts to its forward position to supply the line pressure to path $P_4$, the actuator 30 responds thereto by moving the gear 4 to its right-hand end position through the fork CF, thus bringing the dog gear 4a into meshing engagement with dog gear 5a. When the valve 20 shifts to the reverse position to supply the line pressure to path $P_5$, the actuator 30 brings the gear 4 to its lefthand end position through fork CF, thus causing it to mesh with gear 6a. A valve 40 mounted on the left-hand end of fork CF provides a temporary communication between paths $P_6$ and $P_2$ during the stroke of the gear 4 between its end positions.

A bypass clutch valve 50 is connected with paths $P_3$, $P_6$ and $P_7$ for enabling or disabling a communication between path $P_8$ connected with path $P_o$ and path $P_9$ connected with path $P_1$. In the neutral position of the valve 20 when the line pressure is supplied to path $P_3$, a communication is established between paths $P_8$ and $P_9$ to establish a neutral condition of the transmission H. A communication between paths $P_8$ and $P_9$ is also established during the idling of the engine E and when the line pressure is not supplied to the path $P_6$. However, when the line pressure is supplied to path $P_6$, the communication between paths $P_8$ and $P_9$ is interrupted. The communication between these paths is also interrupted when no line pressure is supplied to path $P_3$ and the rotational speed of the engine E is higher than the idling speed.

The detailed construction of manual shift valve 20, actuator 30, valve 40 and bypass clutch valve 50 is described in U.S. patent application Ser. No. 764,532, filed Feb. 1, 1977, now abandoned, and continuation application Ser. No. 82,225, filed Oct. 4, 1979, both commonly assigned herewith.

An orifice valve 90, a speed ratio adjusting valve 100 and a speed ratio adjusting oil control valve 110 are shown at the upper left side of FIG. 1, and the detail of which will be described below with reference to FIG. 2.

Figure 2:
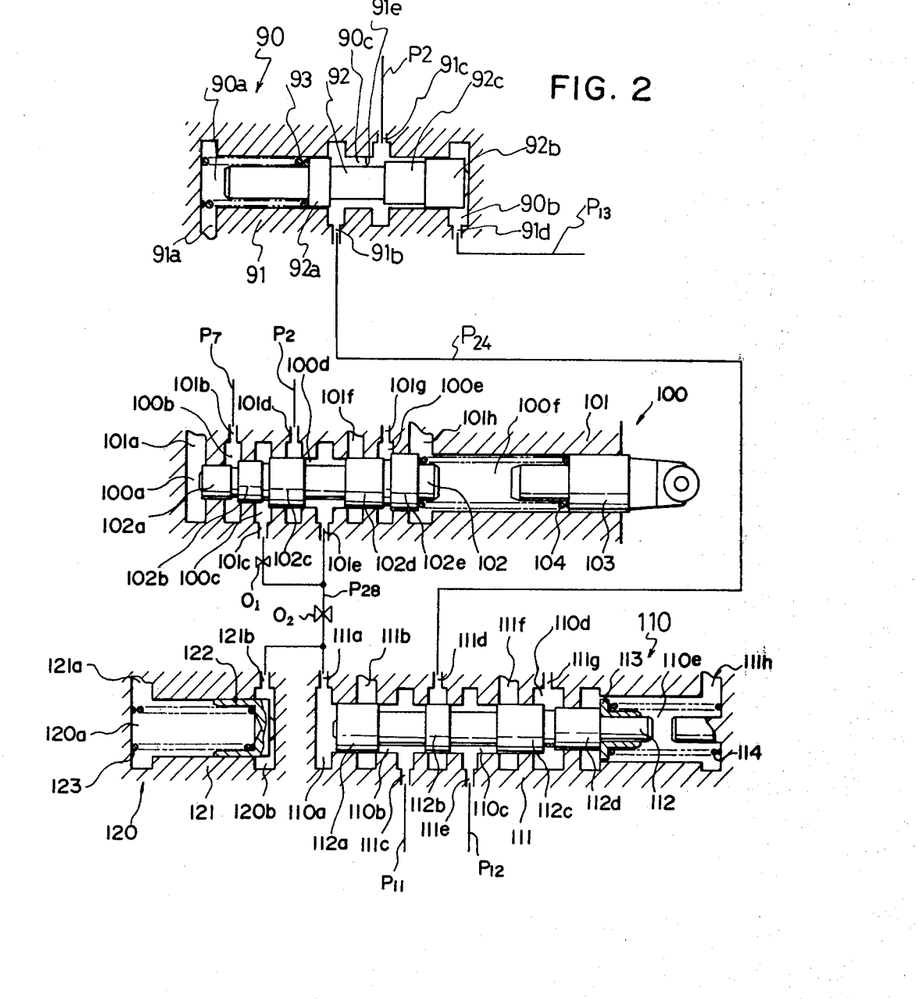
FIG. 2 is a schematic view showing the detail of certain parts shown in FIG. 1.
Figures 3, 4, 5:
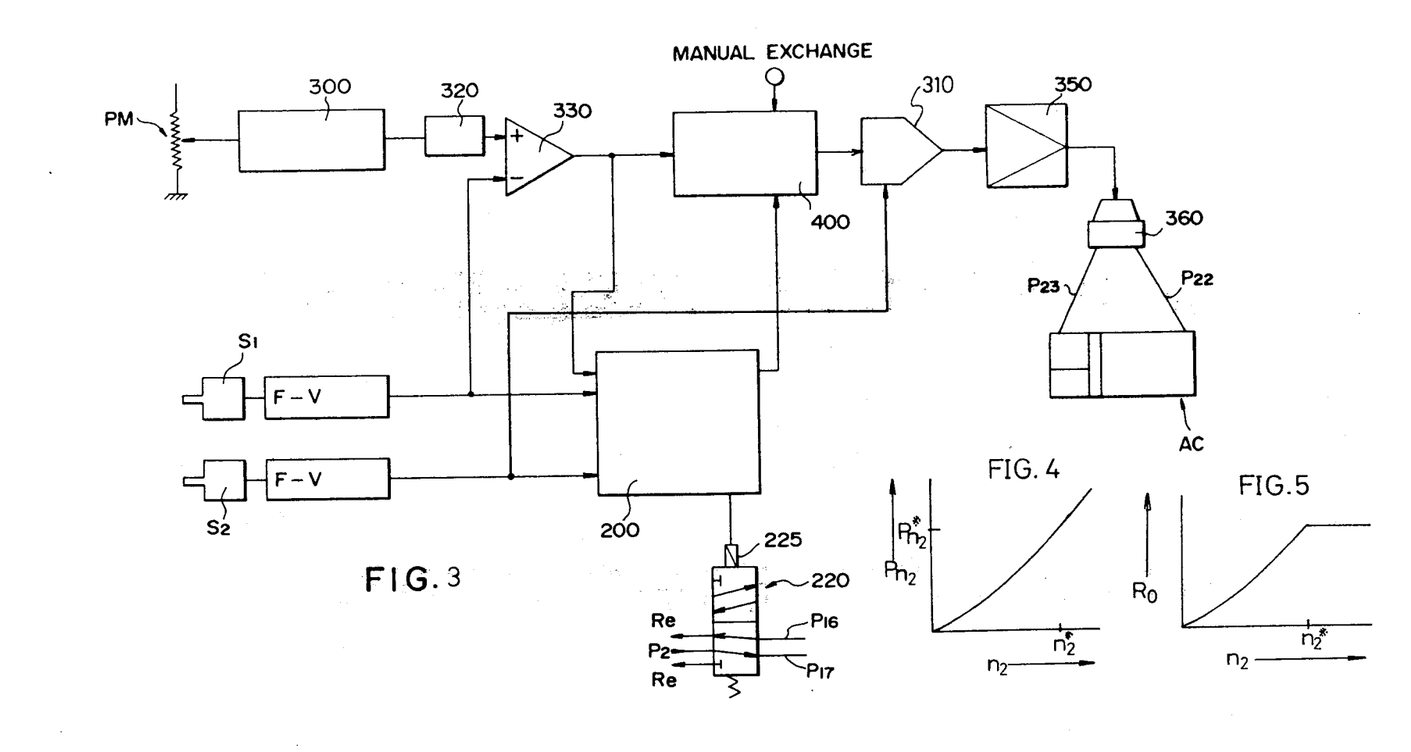
FIG. 3 is a schematic diagram of another embodiment.
FIG. 4 graphically shows the relationship between the rotational speed "$n_2$" of the output shaft of the transmission and the output oil pressure of the governor valve $G_2$ shown in FIG. 1.
FIG. 5 graphically shows the relationship between the rotational speed "$n_2$" of the output shaft of the transmission and the passage resistance "$R_o$" of the orifice valve 90 shown in FIGS. 1 and 2.

Orifice valve 90 shown in the upper portion of FIG. 2 adjusts the passage resistance from oil path $P_2$ to oil path $P_{24}$ in response to the rotational speed of output shaft 10 of hydro-mechanical transmission H. It includes a body 91, a spool 92 slidably fitted in the body, and a spring 93 which pushes the spool toward right. Body 91 has four ports 91a to 91d. First port 91a communicates with reservoir Re, second port 91b communicates with path $P_{24}$, third port 91c communicates with path $P_2$, and fourth port 91d communicates with path $P_{13}$. The oil path $P_{13}$ communicates with a governor valve $G_2$ (FIG. 1) which is connected with output shaft 10 of hydro-mechanical transmission H. The governor value $G_2$ adjusts the line pressure from oil path $P_2$ to a value $P_{n2}$ that corresponds to the rotational speed "$n_2$" of output shaft 10 and supplies it to oil path $P_{13}$. The relationship between the rotational speed "$n_2$" and the pressure "$P_{n2}$" is shown in FIG. 4. Spool 92 has a pair of lands 92a, 92b of a large diameter and a land 92c of a small diameter. The lands 92a, 92b cooperate with body 91 to define an oil chamber 90a communicating with first port 91d, an oil chamber 90b communicating with fourth port 91d, and an annular passage 90c communicating with second and third ports 91b, 91c. Spool 92 moves from the right end position toward left in response to the increase of the pressure $P_{13}$ from zero, and reduces the oil flow passage from path $P_2$ to path $P_{24}$ to increase the passage resistance "$R_o$". The resistance "$R_o$" is proportional to the displacement of spool 92 toward left and constant after the pressure $P_{n2}$ of path $P_{13}$ reaches to a predetermined value $P_{n2}*$ shown in FIG. 4 because the left side end of spool 92 abuts on the left side wall of body 91. Thus the resistance "$R_o$" is constant when the rotational speed "ne" of output shaft 10 exceeds the predetermined value "$n_2*$" as shown in FIG. 5.

Speed ratio adjusting valve 100 adjusts the line pressure from oil path $P_2$ to a predetermined value and supplies it to oil path $P_{28}$ if the rotational speed of the engine is in coincidence with a target value of such speed which corresponds to the throttle opening. However, it adjusts the line pressure from oil path $P_2$ to a value which is higher than the predetermined value by an amount corresponding to a difference between the rotational speed of the engine and its target value and supplies such increased pressure to oil path $P_{28}$ if the rotational speed of the engine is less than the target value while it adjusts the line pressure from oil path $P_2$ to a value which is lower than the predetermined value by an amount corresponding to a difference between the rotational speed of the engine and its target value and supplies such reduced pressure to oil path $P_{28}$ if the rotational speed of the engine is higher than its target value. The value 100 includes a body 101, a spool 102 slidably fitted in the left-hand portion of the body, a piston 103 slidably fitted in the right-hand portion of the body 101, and a coiled compression spring 104 interposed between the spool 102 and piston 103. The body 101 is formed with eight ports 101a and 101h. First port 101a and sixth to eighth ports 101f to 101h communicate with the reservoir Re; fourth port 101d communicates with oil path $P_2$; second port 101b communicates with oil path $P_7$; third port 101c communicates with oil path $P_{28}$ through an orifice $O_1$; and fifth port 101e communicates with oil path $P_{28}$. The spool 102 is formed with five lands 102a to 102e. Land 102b has a greater diameter than land 102a. Lands 102c and 102d have an equal diameter which is greater than the diameter of land 102b. Land 102e has a greater diameter than lands 102c and 102d. The spool 102 cooperates with the body to define an oil chamber 100a communicating with first port 101a, an annular oil chamber 100b communicating with second port 101b, an annular oil chamber 100c communicating with third port 101c, an annular passage 100d communicating with fifth port 101e, and an annular oil chamber 100e communicating with seventh port 101g. An oil chamber 100f is defined between the spool 102 and the piston 103, and communicates with eighth port 101h. At its right-hand end, the piston 103 projects out of the body for abutment against a cam, not shown, which assumes an angular position corresponding to the throttle opening, by being interlocked with the engine throttle S. As a consequence, the piston 103 assumes a position within the body 101 which corresponds to the throttle opening, and adjusts the resilience of spring 104 at a position of the spool 102 in which the annular passage 100d is disconnected from both fourth and sixth ports 101d and 101f to be equal to the sum of the product of a difference in the cross-sectional area of the lands 102c, 102b with the predetermined pressure value of oil path $P_{28}$ and the product of a difference in the cross-sectional area of the lands 102b, 102a with the hydraulic pressure supplied from oil path $P_7$ to the annular oil chamber 100b when the engine speed coincides with its target value. A target engine speed value corresponding to a minimum throttle opening is established at a level which is properly above the idling speed of the engine. The target value of the engine speed increases with an increase in the throttle opening.

A speed ratio adjusting oil control valve 110 is effective to control the degree of communication between a speed ratio down oil path $P_{11}$ on one hand and oil path $P_{24}$ and reservoir Re on the other and also the degree of communication between a speed ratio up oil path $P_{12}$ on one hand and oil path $P_{24}$ and reservoir Re on the other in accordance with the hydraulic pressures supplied from oil path $P_{28}$. It comprises a body 111, a spool 112 slidably fitted in the body, and a spring 114 which urges the spool 112 to the left through a retainer 113. The body 111 is formed with eight ports 111a to 111h. First port 111a communicates with oil path $P_{28}$ through an orifice $O_2$; the second port 111b, sixth port 111f and eighth port 111h communicate with reservoir Re; third port 111c communicates with the speed ratio down oil path $P_{11}$; fourth, source inlet port 111d communicates with oil path $P_{24}$; fifth port 111e communicates with the speed ratio up oil path $P_{12}$; and seventh port 111g communicates with reservoir Re. The spool 112 is formed with four lands 112a to 112d, which cooperate with the body 111 to define an oil chamber 110a communicating with first port 111a, an annular passage 110b communicating with third port 111c, an annular passage 110c communicating with fifth port 111e, an annular oil chamber 110d communicating with seventh port 111g, and an oil chamber 110e communicating with eighth port 111h. The lands 112a to 112c are of an equal diameter while land 112d is of a reduced diameter. The resilience of spring 114 at a position of the spool 112 in which the annular passage 110b is disconnected from both second and fourth ports 111b and 111d and in which the annular passage 110c is disconnected from both fourth and eixth port 111d and 111f is chosen to be equal to the product of the predetermined pressure of oil path $P_{28}$ multiplied by the cross-sectional area of the land 112a.

An accumulator 120 cooperates with an orifice $O_2$ to delay the application of the hydraulic pressure prevailing in oil path $P_{28}$ to the oil chamber 110a of the oil control valve 110, and also enables a rapid sliding movement of the spool 112 to the left. The accumulator comprises a body 121, a piston 122 slidably fitted in the body, and a spring 123 which urges the piston to the right. A chamber 120a located on the left-hand side of piston 122 communicates with the reservoir Re through port 121a while a right-hand chamber 120b communicates with port 111a of the oil control valve 110 through a port 121b and an oil path.

Returning to FIG. 1, a pair of selector valves 130 and 140 control the communication between a pair of oil paths $P_{22}$, $P_{23}$, connected with an actuator AC which is in turn connected with a swash plate associated with the first hydraulic pump motor $M_1$ on one hand and the speed ratio down and up oil paths $P_{11}$ and $P_{12}$ on the other in accordance with the condition of the hydromechanical transmission H. The selector valve 130 controls the communication between oil paths $P_{20}$, $P_{21}$ on one hand and oil paths $P_{16}$, $P_{17}$ on the other in accordance with the presence or absence of the line pressure in oil path $P_5$. In the absence of the line pressure in oil path $P_5$, it provides a communication between oil paths $P_{20}$, $P_{21}$ and oil paths $P_{16}$, $P_{17}$, respectively. In the presence of the line pressure in oil path $P_5$ (reverse operation), it provides a communication between oil paths $P_{20}$, $P_{21}$ and oil paths $P_{17}$, $P_{16}$, respectively. The selector valve 140 controls the communication between oil paths $P_{22}$, $P_{23}$ and the speed ratio down and up oil paths $P_{11}$, $P_{12}$ in accordance with the line pressure in oil paths $P_{20}$, $P_{21}$. When the line pressure is supplied to oil path $P_{20}$, it provides a communication between oil paths $P_{22}$, $P_{23}$ and speed ratio down and up oil paths $P_{11}$, $P_{12}$, respectively. Conversely, when the line pressure is supplied to oil path $P_{21}$, it provides a communication between oil paths $P_{22}$, $P_{23}$ and speed ratio up and down oil paths $P_{12}$, $P_{11}$, respectively. The actuator AC causes the discharge volume of the first hydraulic pump motor $M_1$ to vary toward $+V_M$ shown in FIG. 9 in response to the hydraulic oil supplied through oil path $P_{22}$, and causes the discharge volume of the first hydraulic pump motor $M_1$ to vary toward $-V_M$ shown in FIG. 9 in response to the hydraulic oil supplied through oil path $P_{23}$.

The provision of the selector valves 130, 140 in this manner achieves a communication between the speed ratio down path $P_{11}$ and the speed ratio up path $P_{12}$ on one hand and oil paths $P_{23}$ and $P_{22}$ on the other, respectively, in the transmission status of the hydro-mechanical transmission H, in the forward, low speed ratio mode and in the reverse, high speed ratio mode. Then, the oil control valve 110 provides a communication between the speed ratio down path $P_{11}$ and oil path $P_2$ and provides a communication between the speed ratio up path $P_{12}$ and the reservoir Re. As the actuator AC causes the discharge volume of the first hydraulic pump motor $M_1$ to vary toward $-V_M$ shown in FIG. 9, the speed ratio is lowered. Conversely, when the oil control valve 110 provides a communication between the up path $P_{12}$ and oil path $P_2$ and also a communication between the down path $P_{11}$ and the reservoir Re, the actuator AC causes the discharge volume of the first hydraulic pump motor $M_1$ to vary toward $+V_M$, thereby increasing the speed ratio. In a forward, high speed ratio region mode and a reverse, low speed ratio region mode of the hydro-mechanical transmission H, the down path $P_{11}$ and the up path $P_{12}$ communicate with oil paths $P_{22}$ and $P_{23}$, respectively, so that the oil control valve 110 provides a communication between the down path $P_{11}$ and oil path $P_2$ and a communication between the up path $P_{12}$ and the reservoir Re. Accordingly, the actuator AC causes the discharge volume of the first hydraulic pump motor $M_1$ to vary toward $+V_M$ shown in FIG. 9, thus reducing the speed ratio. When the oil control valve 110 provides a communication between the up path $P_{12}$ and oil path $P_2$ and a communication between the down path $P_{11}$ and reservoir Re, the actuator AC causes the discharge volume of the first hydraulic pump motor $M_1$ to vary toward $-V_M$ shown in FIG. 9, thus increasing the speed ratio.

Figure 6:
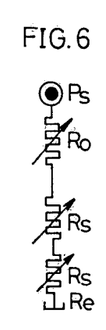
FIG. 6 shows an equivalent circuit of the fluid passage from the orifice valve 90 to the actuator AC through the selector valve 140 and the speed ratio adjusting oil control valve.

When the speed ratio "e" varies in the manner mentioned above, the alteration rate "ė" of the speed ratio will be determined by the flow rate Q into acuator AC from path $P_2$ through orifice valve 90—path $P_{24}$—oil control valve 110—up path $P_{12}$ or down path $P_{11}$. The flow rate Q will be determined by the use of the equivalent circuit shown in FIG. 6, wherein "Rs" represents the passage resistance of speed ratio adjusting oil control valve 110, and "Ro" represents that of orifice valve 90. Assuming that the line pressure of path $P_2$ is Ps, the flow rate Q is represented by the following equation (6):

$$Q = \frac{Ro}{\left(1 + 2(\frac{Ro}{Rs})^2\right)^{\frac{1}{2}} \times \sqrt{Ps}} \quad (6)$$

Figure 7:
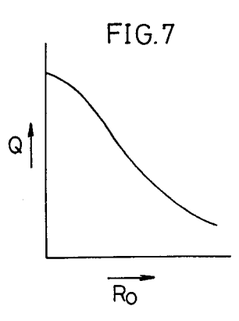
FIG. 7 graphically shows the relationship between the passage resistance "$R_o$" of the orifice valve 90 and the pressure oil flow rate Q to the actuator AC.
Figure 8:
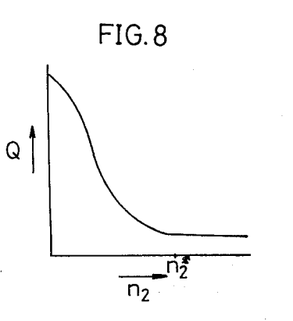
FIG. 8 graphically shows the relationship between the rotational speed "$n_2$" of the output shaft of the transmission and the pressure oil flow rate Q to the actuator AC.

The relationship between the resistance "Ro" and the flow rate "Q" is shown in FIG. 7 provided that the line pressure Ps and the resistance "Rs" are constant. The resistance "Ro" has the relationship with the rotational speed "$n_2$" of output shaft 10 as shown in FIG. 5, therefore the flow rate "Q" has a relationship with the rotational speed "$n_2$" such as shown in FIG. 8. The flow rate "Q" is reverse proportional to the rotational speed "$n_2$" of output shaft 10 as shown in FIG. 8 provided that the resistance "Rs" of oil control valve 110 is constant. In other words, the gain of the alteration rate "ė" is reverse proportional to the rotational speed "$n_2$". It is preferable to determine the minimum gain substantially equal with the gain constant which might cause the abrupt acceleration of the engine in the prior art, by which the alteration rate "ė" of the speed ratio "e" is increased greatly at the starting of the automotive vehicle. Therefore the abrupt acceleration of the engine is prevented and the acceleration characteristic of the vehicle is improved. On the normal running condition of over the predetermined rotational speed "$n_2$*", the alteration "ė" is constant (refer to FIGS. 5 and 8). Thus the normal and stabilized speed ratio control is obtained at the normal running condition of over the predetermined rotational speed "$n_2$*".

A control of the low and high range clutch LC, HC will now be described. A clutch switching and speed ratio detecting valve 150 functions to compare a hydraulic pressure supplied from the governor valve $G_1$ through oil path $P_7$ against a hydraulic pressure supplied through oil path $P_{13}$ from a governor valve $G_2$ which is mounted on the output shaft 10 to detect whether the speed ratio "e" or "−e" assumes a clutch switching speed ratio "e*" defined by a range from "$e_1$*" to $e_2$*" shown in FIG. 9, or "−e*" defined by a range from −$e_1$* to −$e_2$*, and to provide a communication between oil paths $P_{14}$ and $P_{15}$ on one hand and the reservoir Re when the speed ratio is below the switching speed ratio and to provide a communication between oil paths $P_{14}$ and $P_{15}$ on one hand and oil paths $P_{12}$ and $P_{11}$, respectively, when the speed ratio exceeds the switching speed ratio. Thus, if the line pressure is applied to the down path $P_{11}$ in order to reduce the speed ratio when the latter reaches the switching level, the line pressure is supplied to oil path $P_{15}$. Similarly, if the line pressure is applied to the up path $P_{12}$ in order to increase the speed ratio, the line pressure is supplied to oil path $P_{14}$.

A selector valve 160 controls a communication between oil paths $P_{14}$ and $P_{18}$ and a communication between oil paths $P_{15}$ and $P_{19}$ in accordance with the application of the line pressure to oil paths $P_{16}$ and $P_{17}$. It provides a communication between oil paths $P_{14}$ and $P_{18}$ and a communication between oil path $P_{19}$ and the reservoir Re when the line pressure is supplied to oil path $P_{17}$ but is not supplied to oil path $P_{16}$. Conversely, when the line pressure is supplied to oil path $P_{16}$ but is not supplied to oil path $P_{17}$, it provides a communication between oil paths $P_{15}$ and $P_{19}$ and a communication between oil path $P_{18}$ and the reservoir Re.

A clutch control valve 170 controls the application of the line pressure to oil paths $P_{16}$, $P_{17}$. When the vehicle is parked and no line pressure is applied to oil path $P_2$, it provides a communication between oil paths $P_{17}$ and $P_2$ and a communication between oil path $P_{16}$ and reservoir Re in preparation to the actuation of the low range clutch LC, by applying the line pressure to oil path $P_{17}$ whenever the engine E is started to supply the line pressure to oil path $P_2$. Whenever the line pressure of oil path $P_2$ is supplied to oil path $P_{17}$, the clutch control valve 170 maintains the application of the line pressure to oil path $P_{17}$ by being supplied with the line pressure from oil path $P_{17}$. If the speed ratio increases to reach a clutch switching level and the line pressure is supplied to the up path $P_{12}$ in order to further increase the speed ratio while the line pressure is supplied to oil path $P_{17}$, the line pressure will be supplied to oil path $P_{18}$ through the clutch switching and speed ratio detecting valve 150 and selector valve 160, whereby the clutch control valve 170 responds to the line pressure supplied through oil path $P_{18}$ by providing a communication between oil paths $P_{16}$ and $P_2$, thereby actuating the high range clutch HC. It also provides a communication between oil path $P_{17}$ and reservoir Re to deactuate the low range clutch LC, and maintains the application of the line pressure to oil path $P_{16}$ by being supplied with the line pressure from oil path $P_{16}$. When the line pressure is supplied to oil path $P_{16}$, if the speed ratio decreases to rach a clutch switching level and the line pressure is supplied to down path $P_{11}$ in order to further decrease the speed ratio, the clutch switching and speed ratio detecting valve 150 and selector valve 160 supply the line pressure to oil path $P_{19}$. The clutch control valve responds to the line pressure supplied through oil path $P_{19}$ by providing a communication between oil paths $P_{17}$ and $P_2$, thus actuating the low range clutch LC. In addition, it provides a communication between oil path $P_{16}$ and reservoir Re to deactuate the high range clutch HC, which is maintained deactuated.

The starting of the engine E takes place after shifting the manual shift valve 20 to its neutral position. As the engine E starts, the hydraulic pump P is activated to supply the line pressure to oil path $P_2$, and the line pressure is thence transmitted to oil path $P_{17}$ through the clutch control valve 170, thus actuating the low range clutch LC of the hydro-mechanical transmission H. To run the vehicle in the forward direction, the valve 20 is shifted to its forward position to operate the actuator 30, thus bringing the dog gears 4a and 5a of the transmission H into meshing engagement with each other to establish a forward, low speed ratio mode. If it is desired to run the vehicle in the reverse direction, the valve 20 is shifted to its reverse position to operate the actuator 30 so as to achieve a meshing engagement between the gears 4 and 6a of the transmission H to establish a reverse, low speed ratio mode thereof.

In the forward, low speed ratio mode of the transmission H, the throttle opening is not increased unless the accelerator pedal is depressed for purpose of starting, so that the throttle opening is minimum, the rotational speed "$n_1$" of the engine is an idling speed, and the speed ratio adjusting valve 100 provides path $P_{28}$ a higher pressure than the predetermined value because the target rotational speed of the engine corresponding to the minimum throttle opening is determined to exceed the idling speed. The pressure of path $P_{28}$ is applied to oil chamber 110a of speed ratio adjusting oil control valve 110 after a delay time determined by orifice $O_2$ and accumulator 120. Then speed ratio adjusting oil control valve 110 communicates up and down paths $P_{12}$ and $P_{11}$ to reservoir Re and oil path $P_{24}$ respectively. Therefore, the pressure oil in oil path $P_2$ is supplied to actuator AC through orifice valve 90, oil path $P_{24}$, down path $P_{11}$, selector valve 140 and oil path $P_{23}$; and the actuator AC determines the discharge volume of the first hydraulic pump motor $M_1$ at $-V_M$. Thus the speed ratio "e" is adjusted at zero. Spool 92 of orifice valve 90 is at the right side stop position by the force of spring 93 because the oil pressure of oil path $P_{13}$ is zero. Thus the resistance "Ro" of orifice valve 90 is the minimum value.

When the accelerator pedal is depressed for starting the automotive vehicle, the throttle opening increases; piston 103 of speed ratio adjusting valve 100 moves toward spool 102; the force of spring 104 increases up to a value which corresponds the throttle opening and represents a target rotational speed of the engine; thus speed ratio adjusting valve 100 increases the pressure of oil path $P_{28}$; and the oil pressure in oil chamber 110a of speed ratio adjusting oil control valve 110 increases progressively due to the delay operation of orifice $O_2$ and accumulator 120. During increase of the oil pressure in oil chamber 110a, the rotational speed of the engine progressively increases in response to the throttle opening and the speed ratio adjusting valve 100 decreases the pressure of path $P_{28}$ in response to the pressure of the oil path $P_7$, and the pressure of oil chamber 110a of oil control valve 110 begins to decrease in response to the decrease of the pressure of the oil path $P_{28}$ after the pressure of chamber 110a exceeds the pressure of path $P_{28}$. When the pressure of the chamber 110a falls below the predetermined value, the oil control valve 110 communicates up and down paths $P_{12}$ and $P_{11}$ to path $P_{24}$ and reservoir Re respectively. Thus the pressure oil in path $P_2$ begins to flow to actuator AC through orifice valve 90, path $P_{24}$, oil control valve 110, up path $P_{12}$, selector valve 140 and path $P_{22}$; actuator AC increases the discharge volume of the first pump motor $M_1$ toward $+V_M$; and the speed ratio "e" of the transmission H increases. At this time, the bypass clutch valve 50 have interrupted the communication between the oil paths $P_8$ and $P_9$ so that the running resistance of the vehicle is loaded on the engine E through the transmission H. Therefore the vehicle starts and the increase rate of the engine speed becomes smaller progressively. The speed ratio adjusting valve 100 decreases decrease rate of the pressure of path $P_{28}$, and the decrease rate of the pressure of chamber 110a of oil control valve 110 decreases progressively. Then the rotational speed of the engine becomes to decrease; the speed ratio adjusting valve 100 thus increases the pressure of path $P_{28}$; and the pressure of chamber 110a increases. When the pressure of chamber 110a rises up to the predetermined value, oil control valve 110 interrupts up path $P_{12}$ from oil path $P_{24}$ and interrupts the down path $P_{11}$ from reservoir Re, thus the increase of the speed ratio "e" stops. The rotational speed of the engine at this time is substantially equal with the target speed of the engine corresponding to the throttle opening. After the starting of the vehicle, a pressure which corresponds to the rotational speed "$n_2$" of the output shaft 10 is supplied to the chamber 90b of orifice valve 90 through path $P_{13}$ and spool 92 moves toward left against spring 93. Thus the passage resistance Ro of orifice valve 90 increases in response to the increase of the rotational speed "$n_2$" of output shaft 10, and the gain of the alteration rate "ė" decreases in response to the increase of the rotational speed "$n_2$" of output shaft 10. When the rotational speed "$n_2$" reaches to the predetermined value "$n_2*$", the left side end of spool 92 of orifice valve 90 abuts on the body 91. The gain of the alteration rate "ė" is constant thereafter. Due to the alteration of the gain in the manner as described hereinbefore, the alteration rate "ė" at the increasing stage of the speed ratio "e" is large enough to prevent the abrupt acceleration of the engine.

The operation after the starting is similar to the conventional control system (e.g. refer to Japanese Patent Application No. 10,127/1976) except that a lag involved in the transmission of the oil pressure from oil path $P_{28}$ to the oil chamber 110a of the coil control valve 110 produces a smooth change in the speed ratio "e" if the throttle opening is rapidly changed, avoiding a rapid change in the engine speed.

An operation during the reverse mode will not be described since it will be readily understood from the above description.

Figure 10:
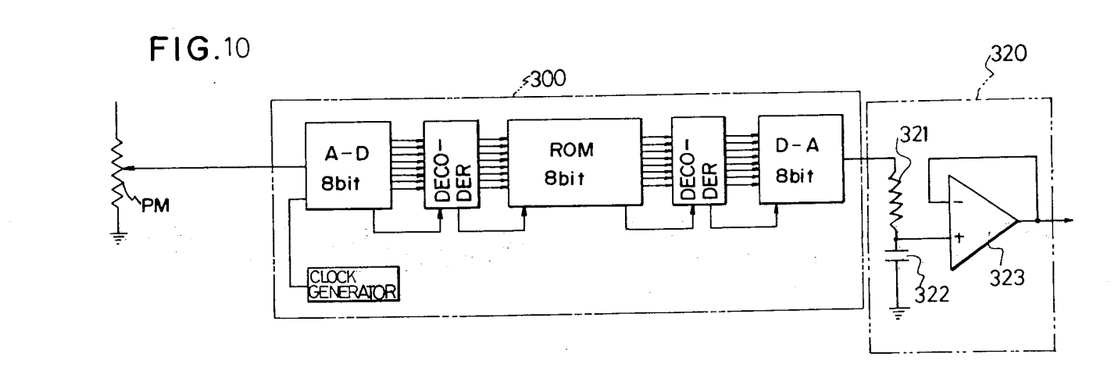
FIG. 10 is a block diagram of a function conversion circuit shown in FIG. 3.

An electrical control of the supply of the hydraulic pressure to the actuator AC as well as the low and the high range clutch LC, HC will now be described. Referring to FIG. 3, there is shown a potentiometer PM which is adapted to move with an engine throttle S. The potentiometer PM will provide a positive output potential which varies with the throttle opening. The output of potentiometer PM is fed to a function conversion circuit 300, the detail of which is shown in FIG. 10. Referring to FIG. 10, it comprises an analog-digital converter A-D, a read only memory ROM, and a digital-angalog converter D-A. The purpose of the function conversion circuit 300 is to produce a positive potential indicative of a target value of the engine speed which corresponds to a throttle opening. As shown in FIG. 10, the output of circuit 300 is fed to a first-order lag circuit or primary delay circuit 320, which comprises resistor 321, capacitor 322 and impedance converting operational element 323. Thence it is supplied to a positive input of an adder-subtractor 330. The adder-subtractor 330 has a negative input which is fed with a positive potential "$n_e$" responsive to the engine speed and which is formed by the combination of a sensor $S_1$ mounted on the input shaft 2 and sensing the number of revolutions thereof and a frequency-potential converter F-V. When the engine speed coincides with its target value, the positive potential "$n_e$" also coincides with the positive output potential of the function conversion circuit 300. It is to be understood that the relationship between the throttle opening and the target value of the engine speed, which has been mentioned previously, also applies in this instance.

The output of the adder-subtractor 330 is fed through a polarity inversion circuit 400 (corresponding to selector valves 130, 140 shown in the embodiment described above), a divider 310 and a servo amplifier 350, in sequence, to a servo valve 360. When the output potential from divider 310 is null (when the output potential of the adder-subtractor 330 is null), the servo valve 360 disconnects both oil paths $P_{22}$ and $P_{23}$ of the actuator AC from oil path $P_2$ and reservoir Re. When the output potential from divider 310 is positive, it provides a communication between oil paths $P_{23}$ and $P_{22}$ and oil path $P_2$ and reservoir Re, respectively. The degree of communication therebetween is controlled in accordance with the magnitude of the positive potential fed from divider 310. If the output from divider 310 is negative, oil paths $P_{22}$ and $P_{23}$ communicate with oil path $P_2$ and reservoir Re, respectively, with the degree of communication being controlled in accordance with the magnitude of the negative potential.

Figure 11:
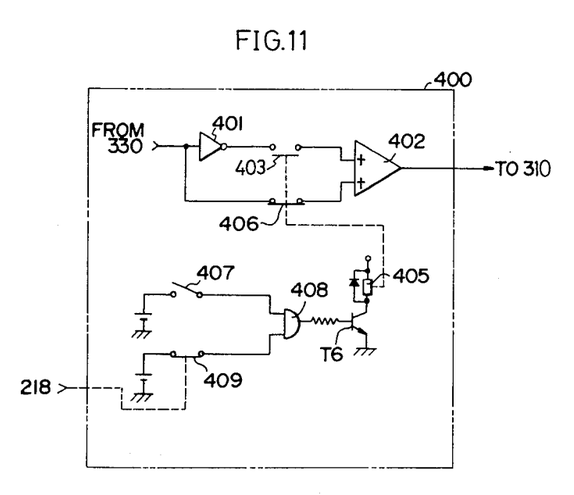
FIG. 11 is a circuit diagram of a primary lag circuit and a compensation circuit shown in FIG. 3.

Referring to FIG. 11, the polarity inversion circuit 400 is shown as comprising an inverter 401 connected to receive the output of the adder-subtractor 330, a normally open switch 403 which is closed by a reed relay 405 to connect the inverter output to an adder 402, and a normally closed contact 406 which opens in response to the energization of a reed relay 405 and passes the output from the adder-subtractor 330 to the adder 402. The reed relay 405 is energized when transistor $T_6$ conducts. It will be seen that transistor $T_6$ is rendered conductive by an exclusive OR circuit 408 when either of switch 407 and normally closed contact 409 is closed. The switch 407 is closed only when the manual shift valve 20 is in its forward position. The normally closed contact 409 is opened in ganged relationship with the solenoid-operated switch 218 during the actuation of the high range clutch HC. In the circuit 400, when the valve 20 is in its forward position and the low range clutch LC is actuated, or when the valve 20 is in its reverse position and the high range clutch HC is actuated, transistor $T_6$ is OFF state and reed relay 405 is deenergized, so that normally closed contact 406 is closed and normally open contact 403 is open. Thus the output from the adder-subtractor 330 is directly applied to divider 310. When the valve 20 is in its forward position and the high range clutch HC is actuated, or when the valve 20 is in its reverse position and the low range clutch LC is actuated, transistor $T_6$ turns ON and normally open contact 403 closes whereas normally closed contact 406 opens, so that the output from the adder-subtractor 330 is applied to divider 310 after its polarity is reversed. The divider 310 divides the output voltage from the polarity inversion circuit 400 with the positive voltage $n_d$ generated by the speed sensor $S_2$ connected with the output shaft 10 and frequency - potential converter F-V. The output from the divider 310 is applied to servo amplifier 350. Therefore, the output voltage applied to the servo valve 360 is high when the rotational speed "$n_2$" of the output shaft 10 is low, even if the output voltage from the adder-subtractor 330 is constant. This means that the gain of the alteration rate "ė" is substantially reverse proportional with the rotational speed "$n_2$" of the output shaft 10.

The clutch control circuit 200 controls a solenoid valve 220, which is normally spring biased to a first position in which oil path $P_{17}$ communicates with oil path $P_2$ and oil path $P_{16}$ communicates with reservoir Re. However, when an associated solenoid 225 is energized, the valve 220 assumes another position in which oil path $P_{16}$ communicates with oil path $P_2$ and oil path $P_{17}$ communicates with reservoir Re. The circuit 200 comprises a multiplier 201 which produces a product of the positive potential "$n_e$" (corresponding to the rotation of the input shaft 2) and a speed ratio "$e_2$*"; another multiplier 202 which produces a product of the positive potential "$n_e$" and a speed ratio "$e_1$*"; a comparator 203 which copares a positive output potential $n_e \cdot e_2$* from the multiplier 201 against a positive output potential $n_d$ from a number-of-revolution sensor $S_2$ mounted on the output shaft 10; and another comparator 204 which compares the positive output potential $n_e \cdot e_1$* from the multiplier 202 against the positive output potential "$n_d$" from the sensor $S_2$. When the comparator 203 determines that the product $n_e \cdot e_2$* is greater than "$n_d$", a positive output is applied to transistor $T_1$ in a relay drive circuit 205. When the comparator 204 determines that "$n_d$" is greater than the product $n_e \cdot e_1$*, a positive output is applied to transistor $T_2$ in a relay drive circuit 208. When the positive output is applied to transistor $T_1$, a reed relay 206 is energized to close a normally open contact 207. When the positive output is applied to transistor $T_2$, a reed relay 209 is energized to close a normally open contact 210. If the both transistors $T_1$, $T_2$ are rendered conductive to close the both contacts 207, 210, a circuit $C_2$ is closed which interconnects a driver $C_3$ for the solenoid valve 220 and the adder-subtractor 330. As a consequence, when the adder-subtractor 330 produces a negative potential, it is passed through an inverter 303, whereby a positive potential is applied to circuit $C_2$ to forward bias transistor $T_3$ in a relay drive circuit 211, thus energizing a reed relay 212 to close a normally open contact 213. When the adder-subtractor 330 produces a positive potential, it is inverted by the element 303 to apply a negative potential to the circuit $C_2$. The negative output is passed through an inverter 214 to be applied to forward bias transistor $T_4$ in a relay drive circuit 215. Thereupon a reed relay 216 is energized to open a normally closed contact 217. Stated differently, the clutch control circuit 200 operates in a manner such that when the speed ratio "e" is within a range defined by "$e_1$*" and "$e_2$*", the both normally open contacts 207, 210 are closed, and if the adder-subtractor 330 produces a negative potential, the normally open contact 213 in the drive circuit $C_3$ is closed to energize a solenoid 205 associated with the solenoid valve 220, a self-holding circuit being completed for the solenoid through the solenoid-operated switch 218. If the adder-subtractor 330 produces a positive potential, the normally closed contact 217 in the drive circuit $C_3$ is opened to deenergize the solenoid 225, whereupon the switch 218 is also opened.

In operation, when the engine E is at rest, the solenoid 225 is not energized, and hence the solenoid valve 220 provides a communication between oil paths $P_{17}$ and $P_{16}$ and oil path $P_2$ and reservoir Re, respectively. When the manual shift valve 20 shown in FIG. 1 is brought to its neutral position in order to start the engine E, the hydraulic pump P operates to supply the line pressure to oil path $P_2$ and thence through the solenoid valve 220 to oil path $P_{17}$, whereby the low range clutch LC is actuated. Subsequently when the manual shift valve 20 is shifted to its forward position in order to run the vehicle in the forward direction, the polarity inversion circuit 400 applies the output from the adder-subtractor 330 directly to the servo amplifier 350. Since the positive potential supplied from the function conversion circuit 300 through the primary delay circuit 320 is higher than the positive potential "$n_e$" supplied from the sensor $S_1$, the adder-subtractor 330 now supplies a positive output potential which corresponds to the difference therebetween. Consequently, a positive potential is applied to the servo valve 360 until the accelerator pedal is depressed, whereby the servo valve 360 provides a communication between oil paths $P_{23}$ and $P_{22}$ and oil path $P_2$ and reservoir Re, respectively. As a result, the actuator AC responds to the line pressure supplied from oil path $P_2$ to oil path $P_{23}$ by changing the discharge volume of the first hydraulic pump motor $M_1$ to $-V_M$ and reducing the speed ratio "e" to null.

When the accelerator pedal is depressed, an increase in the throttle opening cuases a positive output potential from the potentiometer PM to reduce to a value which depends on the magnitude of such opening. In response thereto, the function conversion circuit 300 produces an increased positive output, and also the primary delay circuit 320 progressively increases the positive input to the adder-subtractor 330. Also the negative input to the adder-subtractor 330 progressively increases in response to the increase of the rotational speed of output shaft 10. In response thereto, the positive output from the adder-subtractor 330 decreases progressively. When the negative input to adder-subtractor 330 exceeds the positive input, the output from adder-subtractor 330 becomes a negative voltage which corresponds to the difference between the positive and negative inputs to adder-subtractor 330. The negative output voltage from adder-subtractor 330 is applied to the servo valve 360, which in turn provides a communication between oil paths $P_{22}$ and $P_2$ and between oil path $P_{23}$ and reservoir Re, whereby the actuator AC causes the discharge volume of the first hydraulic pump motor $M_1$ to initiate its change toward $+V_M$, thus starting the vehicle. At the initiation of the increase of the speed ratio "e", the negative voltage applied to the servo valve 360 is remarkably greater than the negative output voltage from the adder-subtractor 330 due to the operation of the divider 310, whereby the alteration rate "ė" becomes large at the initiation of the increase of the speed ratio "e". Thus the abrupt acceleration of the engine is prevented.

The operation which occurs after the starting as well as the operation during the reverse mode will be apparent from the foregoing description, and therefore will not be described separately.

The primary delay circuit 320 can be dispensed. However, the provision of such delay circuit 320 is advantageous in achieving a rapid change from a positive to a negative output potential from the adder-subtractor 330 during a rapid starting. Also, the divider 310 may be interposed between the polarity inversion circuit 400 and the adder-subtractor 330.

In the embodiment described above, the engine speed corresponding to a throttle opening has been chosen as a controlled variable, but the invention is equally applicable if an engine output torque corresponding to a throttle opening, an engine speed corresponding to an engine output torque or an engine output torque corresponding to the number of rotation of an engine is chosen as a controlled variable.

It should also be understood that while the hydromechanical transmission has been utilized as a stepless transmission in the embodiments described above, any other from of stepless transmission may be used.

It will be appreciated from the foregoing that the invention provides means which controls the gain of the alteration rate "ė" of the speed ratio "e" in response to the rotational speed "$n_2$" of the output shaft of the transmission to increase the alteration rate when the rotational speed "$n_2$" is low and decrease the alteration rate when the rotational speed "$n_2$" is high, thereby substantially eliminating an abnormal rise in the engine speed during a starting of the automotive vehicle without deteriorating the speed ratio control characteristic at the usual running speed.

What is claimed is:

1. In an automatic speed ratio control system for a stepless transmission of an automotive vehicle, having a target value signal generator means which produce a target value signal for controlling operation of an engine on the automotive vehicle, a detector means for producing a signal indicative of operation of the engine, a control signal generator means for comparing the signal from the detector means against the target value signal from the target value signal generator means to generate a deviation signal in accordance with a deviation therebetween and controller means responsive to the deviation signal from the control signal generator means to change a speed ratio of the stepless transmission, and these means construct an integration servo control system comprising, means for controlling a gain of an alteration rate of the speed ratio in response to a rotational speed of an output shaft of the stepless transmission to increase the alteration rate when the rotational speed is low and decrease the alteration rate when the rotational speed is high.

2. In an automatic speed ratio control system for a stepless transmission of an automotive vehicle as set forth in claim 1 in which the target value signal generator means includes a piston and a spring of a speed ratio adjusting valve, a part of said piston projecting out of the speed ratio adjusting valve for abutment against a cam which assumes an angular position corresponding to the throttle opening, and one end of said spring abutting on the piston to enforce the piston toward the cam; the control signal generator means includes a spool of the speed ratio adjusting valve, said spool abuting with the other end of the spring and having lands cooperating the valve body of the speed ratio adjusting valve to form oil chambers, the valve body having inlet ports to which a regulated line pressure and a regulated signal pressure which corresponds to the rotational speed of the engine are supplied and at least an outlet port, and said lands, chambers, inlet ports and outlet port being designed to supply out a deviation signal pressure which corresponds to the difference between the regulated signal pressure and the spring force to the spool; said controller means includes a speed ratio adjusting oil control valve having a spool which has lands cooperating the valve body of the oil control valve to form oil chambers and a spring which abuts to the spool, the valve body having a first inlet port to which the deviation signal pressure, a source inlet port, and a first and a second outlet ports, and said lands, chambers, inlets ports and outlet ports being designed to supply out a oil flow, flow rate of which corresponds to the deviation signal pressure, from one of the outlet ports selectively in response to the deviation signal pressure; and said means for controlling the gain of the alteration rate of the speed ratio is an orifice valve supplying an oil flow, flow rate of which is reverse proportional to the rotational speed of the output shaft of the stepless transmission, to the source inlet port of the speed ratio adjusting oil control valve.

3. In an automatic speed ratio control system for a stepless transmission of an automotive vehicle as set forth in claim 2 in which the orifice valve has a spool abuting to a spring and having lands cooperating the valve body of the orifice valve to form oil chambers, the valve body having a source inlet port to which a regulated line pressure is supplied, a signal inlet port to which a regulated signal pressure corresponding to the rotational speed of the output shaft of the transmission is supplied and an outlet port, and the lands, chambers, inlet ports and outlet port being designed to supply out the oil flow, flow rate of which is reverse proportional to the regulated signal pressure, into the signal inlet port.

4. In an automatic speed ratio control system for a stepless transmission of an automotive vehicle as set forth in claim 1 in which the target value signal generator means includes a potentiometer which is adapted to move with the throttle valve in the engine, a function conversion circuit and a first-order lag circuit; the detector means includes a speed sensor which generates a train of pulses, frequency of which corresponds to the rotational speed of the engine, and a frequency-potential converter; the control signal generator means includes an adder-subtractor circuit; the controller means includes a servo amplifier and a servo valve having a control solenoid; and the means for controlling the gain of the alteration rate of the speed ratio includes a speed sensor which generates a train of pulses, frequency of which corresponds to the rotational speed of the output shaft of the transmission, a frequency-potential converter and a circuit means which is interposed between the adder-subtractor circuit and the servo amplifier, the circuit means generates a electric signal which is proportional to the output from adder-subtractor circuit and reverse proportional to the output from the frequency-potential converter.

5. In an automatic speed ratio control system for a stepless transmission of an automotive vehicle as set forth in claim 4 in which the circuit means is a divider which divides the output from the adder-subtractor circuit by the output from the frequency-potential converter.

* * * * *